US011652253B2

(12) United States Patent
Smith et al.

(10) Patent No.: US 11,652,253 B2
(45) Date of Patent: May 16, 2023

(54) ENCLOSURE SEAL AND SEALING METHOD

(71) Applicant: Ford Global Technologies, LLC, Dearborn, MI (US)

(72) Inventors: Thomas Smith, Livonia, MI (US); Samuel Jeffrey Tomlinson, Farmington Hills, MI (US); Christopher William Coyne, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 923 days.

(21) Appl. No.: 16/059,267

(22) Filed: Aug. 9, 2018

(65) Prior Publication Data

US 2020/0052252 A1 Feb. 13, 2020

(51) Int. Cl.
*H01M 50/186* (2021.01)
*H01M 50/103* (2021.01)
*H01M 50/271* (2021.01)
*H01M 50/209* (2021.01)
*H01M 50/184* (2021.01)
*H01M 50/262* (2021.01)

(52) U.S. Cl.
CPC ....... *H01M 50/186* (2021.01); *H01M 50/103* (2021.01); *H01M 50/184* (2021.01); *H01M 50/209* (2021.01); *H01M 50/262* (2021.01); *H01M 50/271* (2021.01); *H01M 2220/20* (2013.01)

(58) Field of Classification Search
CPC ........... H01M 2/08; B65D 2543/00601; B65D 88/46; B65D 2543/00564; B66F 9/07531; B66F 9/07536; B29C 66/8618; B29L 2031/7146; B60R 16/04
See application file for complete search history.

(56) References Cited

U.S. PATENT DOCUMENTS

| 2,094,329 | A | 9/1937 | Mascuch |
| 6,247,271 | B1 | 6/2001 | Fioritto et al. |
| 9,601,723 | B2 | 3/2017 | Nielsen |
| 2004/0033415 | A1* | 2/2004 | Chen ............... H01M 10/6562 429/99 |
| 2006/0081635 | A1* | 4/2006 | Matsutori ............. F16J 15/061 220/378 |
| 2010/0136402 | A1 | 6/2010 | Hermann et al. |
| 2012/0164500 | A1* | 6/2012 | Loo ..................... H01M 2/1229 429/82 |

(Continued)

OTHER PUBLICATIONS

Definition of Seal provided by Oxford Language; printed Jul. 23, 2021 (Year: 2021).*

*Primary Examiner* — Maria Laios
(74) *Attorney, Agent, or Firm* — David B. Kelley; Carlson, Gaskey & Olds, P.C.

(57) ABSTRACT

An exemplary enclosure assembly includes, among other things, first and second pieces of an enclosure having an interior area. The first and second pieces are pressed vertically together at an interface. A gasket seal seals the interface at a position outside the interface relative to the interior area. An exemplary enclosure securing method includes, among other things, sealing an interface by compressing a gasket seal horizontally between first and second enclosure pieces of an enclosure that provides an interior area. The first and second pieces are pressed vertically together along the interface.

20 Claims, 4 Drawing Sheets

(56) References Cited

U.S. PATENT DOCUMENTS

2012/0244422 A1 9/2012 Ushijima
2015/0079454 A1 3/2015 Maguire et al.
2018/0097265 A1 4/2018 Tarlau et al.

* cited by examiner

ENCLOSURE SEAL AND SEALING METHOD

TECHNICAL FIELD

This disclosure relates generally to sealing interfaces of a traction battery enclosure.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery can include battery arrays each including a plurality of interconnected battery cells that store energy. Some electrified vehicles, such as PHEVs, can charge the traction battery from an external power source.

The traction battery can include an enclosure for housing the battery arrays. The enclosure can include multiple pieces that are secured together using mechanical fasteners. Seals can be used to block movement of, for example, contaminants and moisture between an interior and an exterior of the enclosure. Other areas of vehicles an use other types of enclosures.

SUMMARY

An enclosure assembly according to an exemplary aspect of the present disclosure includes, among other things, first and second pieces of an enclosure having an interior area. The first and second pieces are pressed vertically together at an interface. A gasket seal seals the interface at a position outside the interface relative to the interior area.

A further non-limiting embodiment of the foregoing assembly includes fasteners that join together the first and second pieces.

A further non-limiting embodiment of any of the foregoing assemblies includes at least one array of battery cells disposed within the interior area.

In a further non-limiting embodiment of any of the foregoing assemblies, the interface is disposed along a first plane and the gasket seal seals the interface by contacting surfaces of the first and second pieces. The surfaces are disposed along respective second planes that are transverse to the first plane.

In a further non-limiting embodiment of any of the foregoing assemblies, the gasket seal extends circumferentially continuously about the interior area and about the interface.

In a further non-limiting embodiment of any of the foregoing assemblies, the gasket seal includes a portion disposed horizontally between a downward extending flange of first piece, and a sidewall of the second piece.

In a further non-limiting embodiment of any of the foregoing assemblies, the first pieces is an enclosure lid of a battery enclosure, and the second piece is an enclosure tray of the battery enclosure.

In a further non-limiting embodiment of any of the foregoing assemblies, the portion includes seal fins extending from a first horizontally facing side of the portion.

In a further non-limiting embodiment of any of the foregoing assemblies, the portion includes stand-offs extending from an opposite, second horizontally facing side of the portion.

In a further non-limiting embodiment of any of the foregoing assemblies, the first horizontally facing side faces away from the interior area and the seal fins contact the vertically downward extending flange. The second horizontally facing side faces toward the interior area and the stand-offs contact the sidewall.

In a further non-limiting embodiment of any of the foregoing assemblies, positions where the seal fins extend from the first side are vertically offset from positions where the stand-offs extend from the second side.

In a further non-limiting embodiment of any of the foregoing assemblies, the portion is a first portion that extends longitudinally in a vertical direction, and the gasket seal includes a second portion that extends longitudinally in a horizontal direction. The second portion is disposed within a groove of first or the second piece.

An enclosure securing method according to another exemplary aspect of the present disclosure includes, among other things, sealing an interface by compressing a gasket seal horizontally between first and second enclosure pieces of a battery pack enclosure that provides an interior area. The first and second pieces are pressed vertically together along the interface.

In a further non-limiting embodiment of the foregoing method, the compressing is at a position outside of the interface relative to the interior area.

In a further non-limiting embodiment of the foregoing method, the gasket seal extends circumferentially continuously about a perimeter of the interior area.

In a further non-limiting embodiment of the foregoing method, the compressing comprises compressing a portion of the gasket seal between a downwardly extending flange of the first piece and a sidewall of the second piece.

In a further non-limiting embodiment of the foregoing method, the portion of the gasket seal includes fins that are flexed during the compressing.

In a further non-limiting embodiment of the foregoing method, the first and second pieces are pressed together by a plurality of fasteners.

A further non-limiting embodiment of the foregoing method includes holding at least one array of battery cells within the interior area.

In a further non-limiting embodiment of the foregoing method, the enclosure is a battery pack enclosure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to sealing an interface of a battery pack enclosure. In particular, the disclosure details a seal that seals the interface from a position outside the interface.

Figure 1:
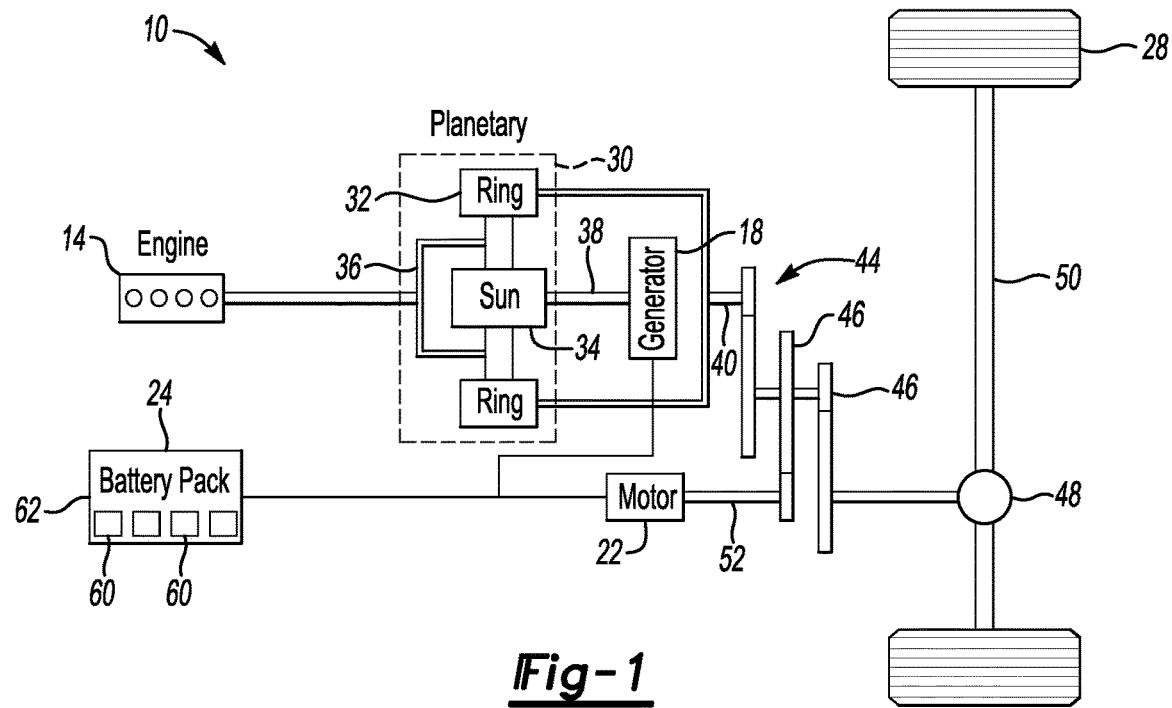
FIG. 1 illustrates a schematic view of a powertrain of an electrified vehicle.

FIG. 1 schematically illustrates a powertrain 10 for an electrified vehicle. Although depicted as a hybrid electrified vehicle (HEV), it should be understood that the concepts described herein are not limited to HEVs and could extend to other electrified vehicles, including, but not limited to, plug-in hybrid electrified vehicles (PHEVs), fuel cell vehicles, and battery electrified vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle.

The engine 14, which is an internal combustion engine in this example, and the generator 18 may be connected through a power transfer unit 30. In one non-limiting embodiment, the power transfer unit 30 is a planetary gear set that includes a ring gear 32, a sun gear 34, and a carrier assembly 36. Of course, other types of power transfer units, including other gear sets and transmissions, may be used to connect the engine 14 to the generator 18.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electrified vehicle enclosure assembly. The battery pack 24 may have the form of a high-voltage battery that is capable of outputting electrical power to operate the motor 22 and the generator 18. Other types of energy storage devices and/or output devices can also be used with the electrified vehicle having the powertrain 10. The battery pack 24 is a traction battery pack as the battery pack 24 can provides power to propel the wheels 28. The battery pack 24 can include a plurality of arrays 60 of individual battery cells held within an enclosure 62.

Figure 2:
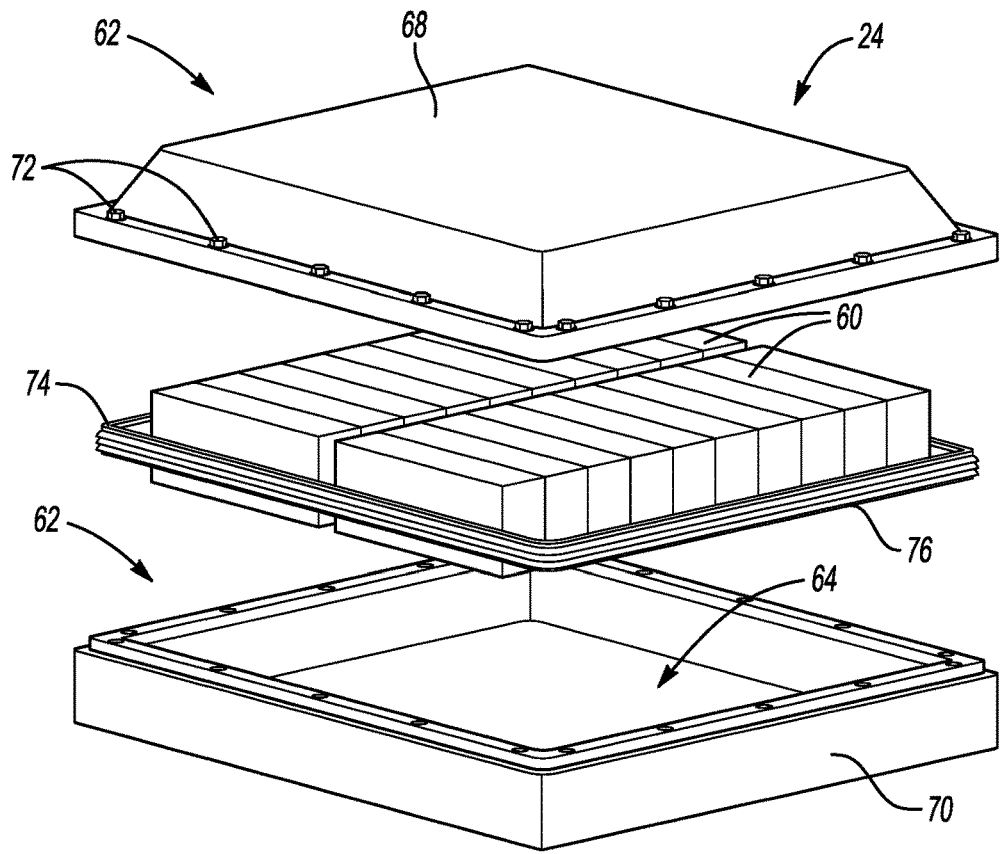
FIG. 2 illustrates an expanded view of selected portions of a battery pack from the powertrain of FIG. 1.
Figure 3:
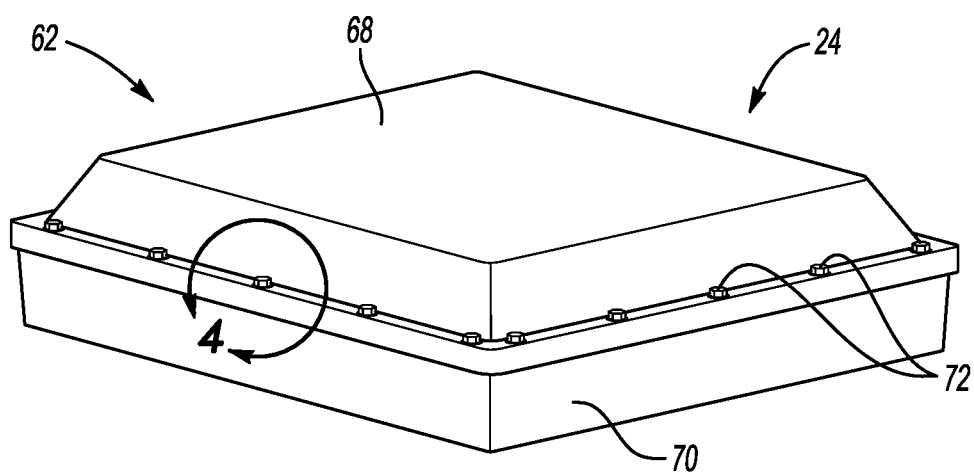
FIG. 3 illustrates the battery pack of FIG. 2 when assembled.
Figure 4:
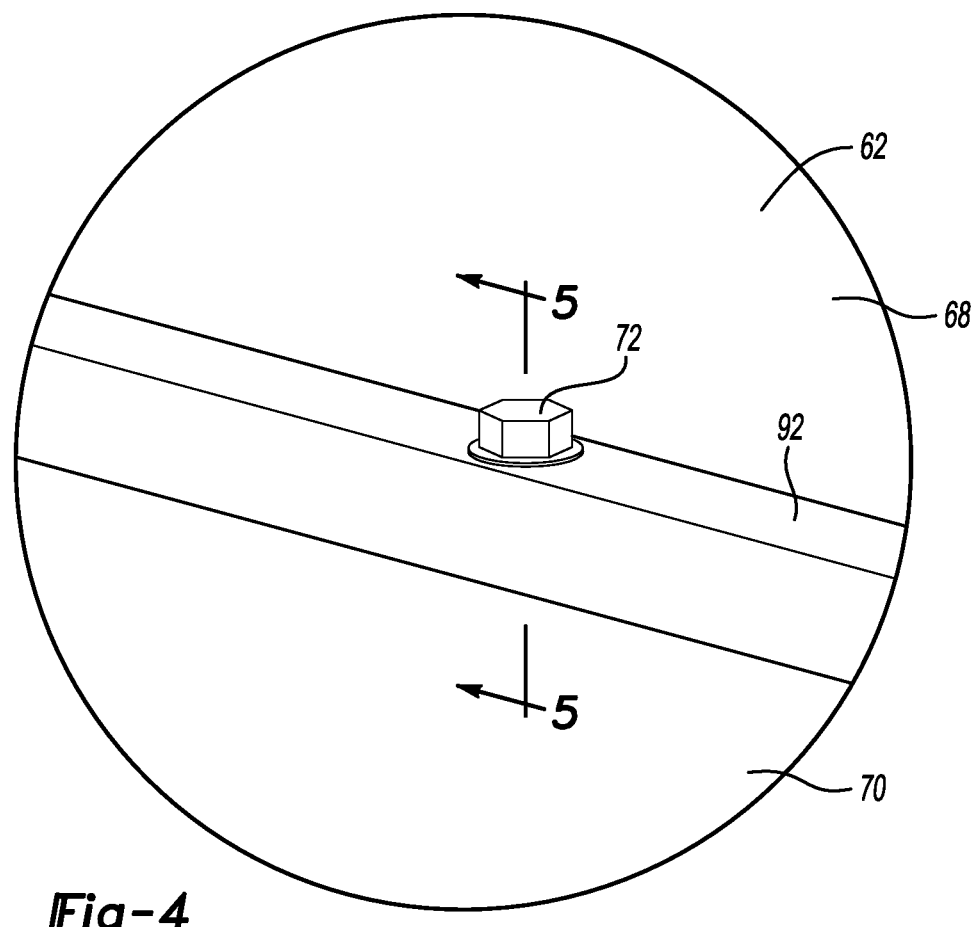
FIG. 4 illustrates a close-up view of Area 4 in FIG. 3.

With reference now to FIGS. 2-4, the enclosure 62 of the battery pack 24 provides an interior area 64 that holds the arrays 60 of individual battery cells. The interior area 64 can hold other components of the battery pack 24, such as electronic components, control modules, etc.

The enclosure 62 includes a plurality of pieces. In the exemplary embodiment, one of the enclosure pieces is an enclosure lid 68 and another of the pieces is an enclosure tray 70. In this example, threaded mechanical fasteners 72 secure the lid 68 to the tray 70 to enclose the arrays 60 within the interior area 64. Although the exemplary enclosure 62 includes two pieces (i.e., the lid 68 and the tray 70) secured together to enclose the interior area 64, other enclosures could include other numbers of pieces.

Figure 5:
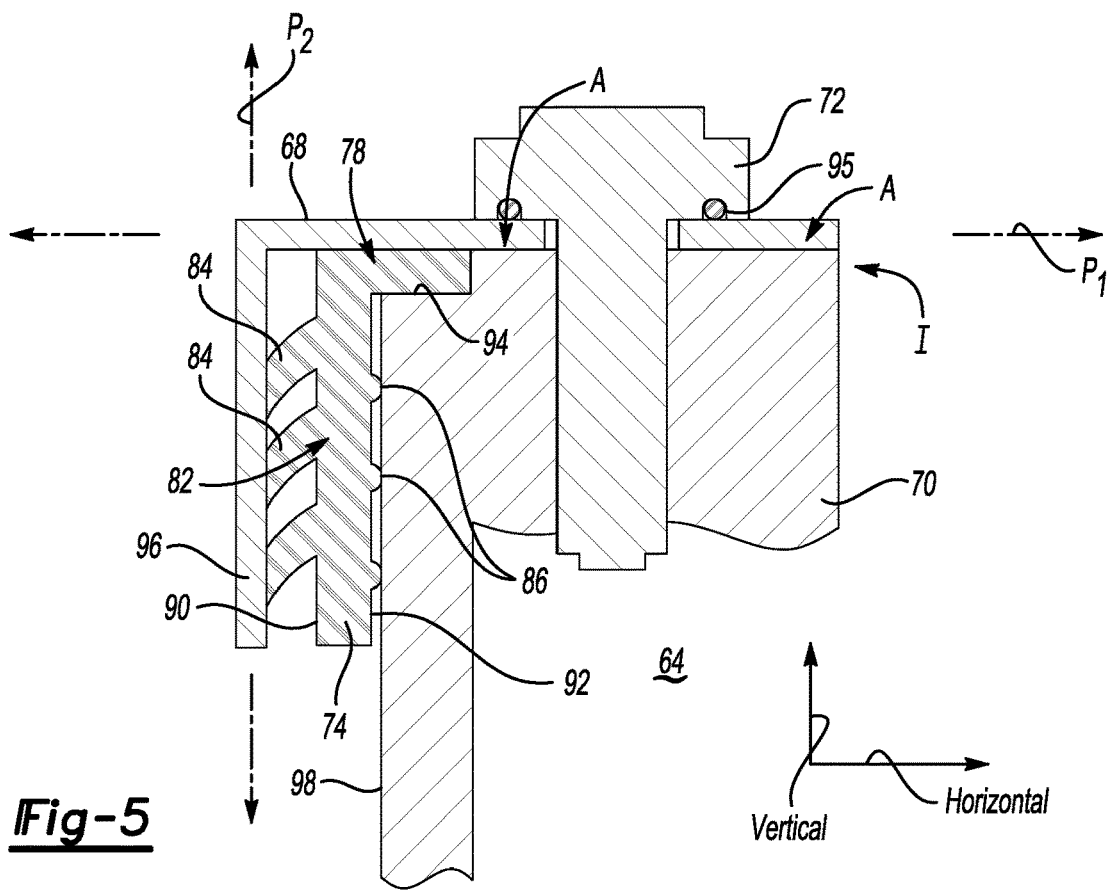
FIG. 5 illustrates a section view taken at line 5-5 in FIG. 4.

The mechanical fasteners press the lid 68 and the tray 70 vertically together at an interface I (FIG. 5). Vertical and horizontal, for purposes of this disclosure, is with reference to the typically orientation of the battery pack 24 when installed within a vehicle and with reference to ground.

When the battery pack 24 is assembled, a gasket seal 74 is positioned between portions of the lid 68 and the tray 70. The gasket seal 74 can block contaminants and moisture from moving through the interface I between the interior area 64 and an exterior area surrounding the battery pack 24.

The gasket seal 74, in this example, extends circumferentially continuously about a perimeter of the interior area 64. The gasket seal 74 is outside the interface I relative to the interior area 64. That is, the interface I is between the gasket seal 74 and the interior area 64 relative to the path that contaminates outside the battery pack 24 must travel to move through the interface I to the interior area 64.

The gasket seal 74 can be extruded. Ends of the gasket seal 74 can then be joined at a seam 76 to provide the circumferentially continuous structure. A person having skill in this art and the benefit of this disclosure would understand how to structurally distinguish an extruded structure from a structure that is not extruded.

The gasket seal 74, in this exemplary embodiment, includes a seal lip 78, a seal flange 82, a plurality of seal fins 84, and a plurality of seal stand-offs 86.

In the exemplary non-limiting embodiment, the seal lip 78 extends horizontally, and the seal flange 82 extends vertically downward from the seal lip 78. The seal fins 84 are disposed along a first side 90 of the seal flange 82 and are vertically spaced from each other. The seal stand-offs 86 are disposed along an opposite, second side 92 of the seal flange 82 and are vertically spaced from each other. The seal fins 84 are vertically misaligned relative to the seal stand-offs 86.

During assembly, the seal lip 78 can be fit within a groove 94 of the tray 70. The groove 94 can help to ensure that the gasket seal 74 is properly aligned. Hoop stress associated with the gasket seal 74 can then hold the gasket seal 74 on the tray 70. Next, the lid 68 can be secured relative to the tray 70 using the fasteners 72. Once installed, the seal lip 78 fits vertically between the lid 68 and the tray 70.

An annular fastener ring seal 95 separate from the gasket seal 74 can seal the interface between a head of the fastener 72 and the lid 68. Notably, the clamp load associated with securing the fasteners 72 can pass directly from the lid 68 to the tray 70. This can reduce the load required to secure the fasteners 72 from designs that substantially compress a battery pack perimeter seal with a fastener clamp load.

The lid 68 includes a downwardly extending enclosure flange 96. When the lid 68 is secured relative to the tray 70, the seal flange 82 is captured and compressed horizontally between the enclosure flange 96 and a sidewall 98 of the tray 70. The seal fins 84 are biased outward against the enclosure flange 96. During assembly, the positioning of the enclosure flange 96 can flex the seal fins 84 inward toward the interior area 64. The contact between the seal fins 84 and the enclosure flange 96 can help to seal areas along the first side 90 of the seal flange 82. Positioning the enclosure flange 96 against the seal fins 84 rather than directly against a relatively planar side of the seal flange 82 can reduce the efforts required to assembly the lid 68 to the tray 70.

The stand-offs 86 extend from the seal flange 82 to the sidewall 98. Contact between the stand-offs 86 can help to seal areas along the opposite, second side 92 of the seal flange 82. Using the stand-offs 86 rather than a relatively planar side of the seal flange 82 can help to enhance the sealing as forces pressing the gasket seal 74 toward the sidewall 98 are focused through the seal stand-offs 86 rather than spread over the inwardly facing side of the seal flange 82.

Focusing the loads through the seal stand-offs 86 results in a relatively high contact load pressing the stand-offs 86 and the sidewall 98 against each other. Offsetting the seal stand-offs 86 vertically from the seal fins 84 can also help to focus the forces through the seal stand-offs 86. In another example, one or more of the stand-offs could be provided by the tray 70 as, for example, raised ribs extending laterally outward from the sidewall 98.

The gasket seal 74 is disposed outside the fasteners 72 relative to the interior area 64. The sealing provided by the gasket seal 74 can block moisture, for example, from entering areas A of the interface I. Moisture in the areas A can be difficult to remove as the moisture in the areas A does not readily drain away due to gravity. Moisture sitting in the areas A could lead to corrosion of the fastener 72, the tray 70, the lid 68, or other components.

Because the downwardly extending enclosure flange 96 and the sidewall 98 seal against the seal flange 82, which extends vertically downward, moisture blocked by the gasket seal 74 can drain downward to reduce the likelihood of corrosion due to residual moisture. As required, the sealing interfaces between the seal lip 78, the tray 70, and the lid 68 can block moisture and contaminants that have moved past the seal flange 82 from outside the battery pack 24 from entering the areas A.

In the exemplary, non-limiting embodiment, the interface I is disposed along a first plane $P_1$ and the gasket seal 74 seals the interface I by contacting surfaces of the enclosure flange 96 and the sidewall 98 that are disposed along respective second planes. The enclosure flange 96, for example, is disposed along a second plane $P_2$ in FIG. 5. The second planes are transverse to the first plane $P_1$.

The first plane $P_1$ is horizontal in this example, but could be tilted relative to a horizontally extending axis. The second planes are depicted as vertical, but could be tilted relative to a vertically extending axis. Further, although the interface I is depicted as planar, the interface could include irregularities such that the interface I is not planar.

Notably, in some examples, the seal fins 84 could be used to vent in response to a pressure increase within the interior 64. A build-up of pressure within the interior could, for example, force the seal fins 84 away from the enclosure flange 96 to provide a passageway that releases pressure from the interior 64.

In this disclosure, like reference numerals designate like elements where appropriate, and reference numerals with the addition of one-hundred or multiples thereof designate modified elements. The modified elements incorporate the same features and benefits of the corresponding modified elements, except where stated otherwise.

Figure 6:
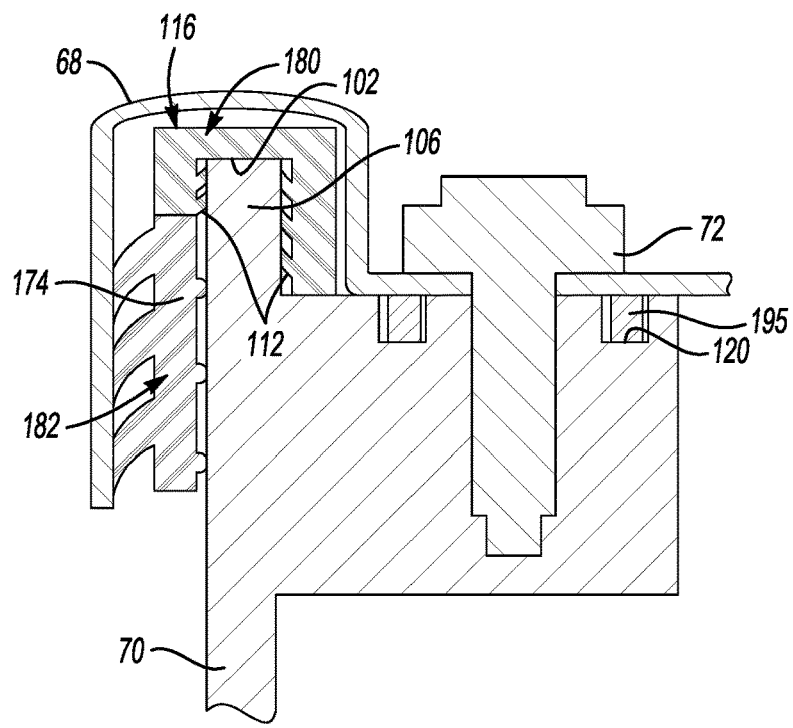
FIG. 6 illustrates a section view of a battery pack according to another exemplary aspect of the present disclosure.

With reference now to FIG. 6, a gasket seal 174, according to another exemplary non-limiting embodiment, includes a seal lip 180 providing a channel 102 that receives a raised rib 106 of the tray 70 when installed. The gasket seal 174 can include fins 112 about the channel 102. The fins 112 flex as the seal lip 180 is fit over the raised rib 106. The fins 112 can reduce the efforts required to fit the seal lip 180 on the raised rib 106. The lid 68 can include a cavity 116 to accommodate the raised rib 106 and the gasket seal 174.

In the FIG. 6 embodiment, the gasket seal 174 is a dual material coextrusion. The seal lip 180 can have a first material composition, and the seal flange 182 a different, second material composition. The first and second material compositions are extruded together to provide the gasket seal 174. The first material composition can be more rigid than the second material composition. The more rigid, or stiffer, first material composition can facilitate locating and retaining the gasket seal 174 over the raised rib 106 whereas the softer second material composition facilitates sealing. The first and second materials compositions could include a combination of elastomer and a thermoplastic elastomer. The amounts would be varied to adjust a durometer of the material composition. Generally, the higher the durometer, the more rigid the material, and the lower the durometer, the softer the material.

In the FIG. 6 embodiment, the annular ring seal 195 that seals the fastener 72 is fit within a groove 120 of the tray 70 and disposed between the lid 68 and the tray 70. A bore 126 that receives the fastener 72 is within the tray 70 and is closed at one end in contrast to the embodiment shown in FIG. 5.

Figure 7:
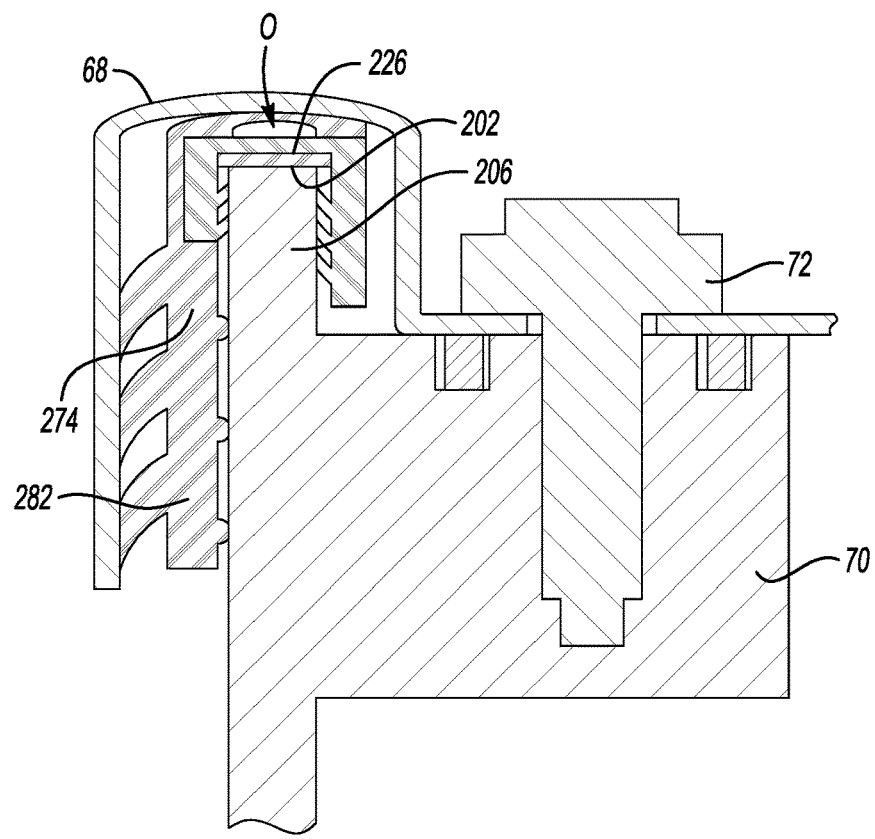
FIG. 7 illustrates a section view of a battery pack according to yet another exemplary aspect of the present disclosure.

With reference now to FIG. 7, a seal 274, according to another exemplary non-limiting embodiment, is a multipart extrusion. A relatively rigid first material composition provides a channel 202 that receives a raised rib 206 of the tray 70. A relatively soft second material composition provides a seal flange 282. The relatively soft second material also includes a first secondary-sealing portion vertically between the raised rib 206 and a floor 226 of the channel 202, and a second secondary-sealing portion vertically between the floor 226 and the lid 68. The first and second secondary-sealing portions are compressed when the lid 68 and the tray 70 are secured together to provide secondary sealing that is in addition to the primary sealing provided by the seal flange 282. The seal 274 can include an interior area O that at least partially collapses when the lid 68 is secured to the tray 70.

Figure 8:
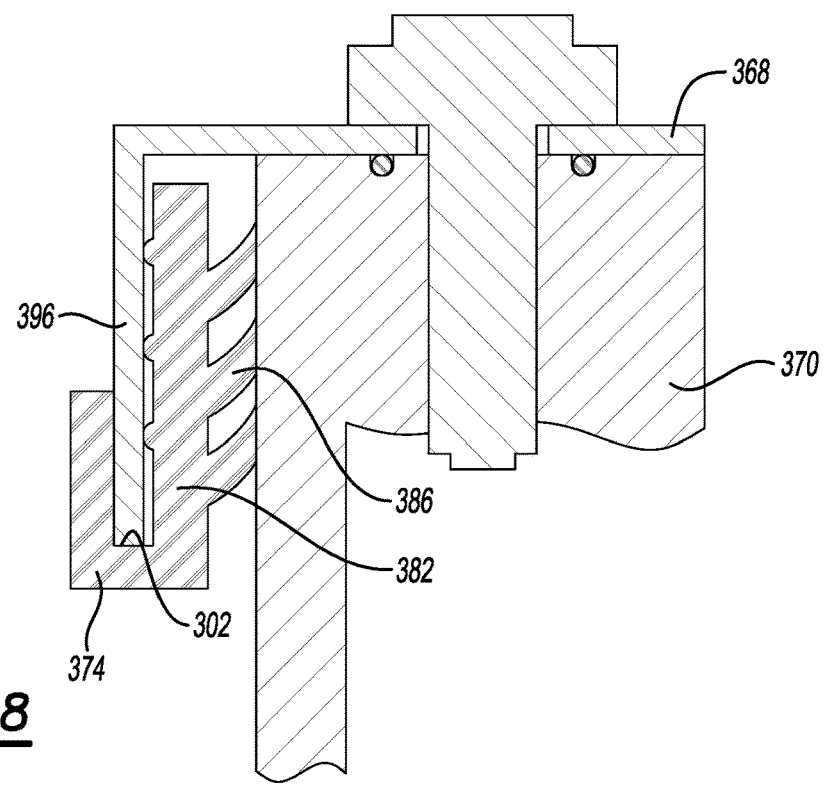
FIG. 8 illustrates a section view of a battery pack according to yet another exemplary aspect of the present disclosure.

With reference now to FIG. 8, a seal 374, according to another exemplary non-limiting embodiment, is a multipart extrusion. A relatively rigid first material composition provides a channel 302 that receives a downwardly extending enclosure flange 396 of a lid 368. A relatively soft second material composition provides a seal flange 382. The relatively soft second material includes fins 384 that contact the tray 370, and stand-offs 386 that contact the flange 396. The FIG. 8 embodiment may need to account for pressure in the interior 64 to avoid the pressure dislodging the seal 374. Forming the lid 368 and the tray 370 may be simpler than the lid and the tray of FIGS. 5-7, for example.

While described in connection with a traction battery, the seals of this disclosure could be used in other devices, especially where sealing an interior from an outside environment is desired. An inverter system controller (ISC) of a vehicle could benefit from the seals of this disclosure, for example.

Features of the disclosed examples include seals that can help to avoid standing moisture that may lead to corrosion. Another feature is that the fastener load can be reduced as the fastener load is not substantially required for sealing. Yet another feature is a seal that can be extruded, and that requires relatively little horizontal packaging area. In some examples, the seal could operate as a venting mechanism for the battery pack.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An assembly, comprising:
   first and second pieces of an enclosure having an interior area, the first and second pieces pressed vertically together at an interface;
   a plurality of fasteners that join together the first and second pieces; and
   a gasket seal that is outside the plurality of fasteners relative to the interior area, the gasket seal sealing the interface at a position outside the interface relative to the interior area.

2. The assembly of claim 1, further comprising at least one array of battery cells disposed within the interior area.

3. The assembly of claim 1, wherein the interface is disposed along a first plane and the gasket seal seals the interface by contacting surfaces of the first and second pieces, the surfaces are disposed along respective second planes that are transverse to the first plane.

4. The enclosure assembly of claim 1, wherein the gasket seal extends circumferentially continuously about the interior area and about the interface.

5. The enclosure assembly of claim 1, wherein the gasket seal includes a portion disposed horizontally between a downward extending flange of first piece, and a sidewall of the second piece.

6. The enclosure assembly of claim 5, wherein the first piece is an enclosure lid of a battery enclosure, and the second piece is an enclosure tray of the battery enclosure.

7. The enclosure assembly of claim 5, wherein the portion includes a plurality of seal fins extending from a first horizontally facing side of the portion.

8. The enclosure assembly of claim 7, wherein the portion includes a plurality of stand-offs extending from an opposite, second horizontally facing side of the portion.

9. The enclosure assembly of claim 8, wherein the first horizontally facing side faces away from the interior area and the seal fins contact the vertically downward extending flange, wherein the second horizontally facing side faces toward the interior area and the stand-offs contact the sidewall.

10. The enclosure assembly of claim 9, wherein positions where the seal fins extend from the first side are vertically offset from positions where the stand-offs extend from the second side.

11. The enclosure assembly of claim 5, wherein the portion is a first portion that extends longitudinally in a vertical direction, and the gasket seal includes a second portion that extends longitudinally in a horizontal direction, the second portion disposed within a groove of first or the second piece.

12. The enclosure assembly of claim 1, wherein the gasket seal circumscribes the plurality of fasteners.

13. An enclosure securing method, comprising:
   sealing an interface by compressing a gasket seal horizontally between first and second enclosure pieces of an enclosure that provides an interior area, the first and second pieces pressed vertically together along the interface; and
   pressing the first and second pieces together using a plurality of fasteners, the gasket seal outside the plurality of fasteners relative to the interior area.

14. The enclosure securing method of claim 13, wherein the gasket seal extends circumferentially continuously about a perimeter of the interior area.

15. The enclosure securing method of claim 13, wherein the compressing comprises compressing a portion of the gasket seal between a downwardly extending flange of the first piece and a sidewall of the second piece.

16. The enclosure securing method of claim 15, wherein the portion of the gasket seal includes a plurality of fins that are flexed during the compressing.

17. The enclosure securing method of claim 13, further comprising holding at least one array of battery cells within the interior area.

18. The enclosure securing method of claim 13, wherein the enclosure is a battery pack enclosure.

19. An assembly, comprising:
   first and second pieces of an enclosure having an interior area, a plurality of fasteners distributed circumferentially about the interior area, the plurality of fasteners pressing the first and second pieces vertically together at an interface; and
   a gasket seal that extends circumferentially about the plurality of fasteners, the gasket seal sealing the interface at a position outside the interface relative to the interior area.

20. The assembly of claim 19, wherein the plurality of fasteners each extend through both the first piece and the second piece.

* * * * *